(12) United States Patent
Berkey et al.

(10) Patent No.: US 12,472,493 B2
(45) Date of Patent: Nov. 18, 2025

(54) FABRICATION OF FLOW REACTOR MODULES AND MODULES PRODUCED

(71) Applicant: CORNING INCORPORATED, Corning, NY (US)

(72) Inventors: George Edward Berkey, Pine City, NY (US); Alexander Lee Cuno, Sayre, PA (US); John Walter Grunden, Lawrenceville, PA (US); Kyler Robert Hurlburt, Horseheads, NY (US); Yanxia Ann Lu, Sunnyvale, CA (US); James Scott Sutherland, Painted Post, NY (US); Oscar Walter Wheeler, Avon, NY (US)

(73) Assignee: CORNING INCORPORATED, Corning, NY (US)

( * ) Notice: Subject to any disclaimer, the term of this patent is extended or adjusted under 35 U.S.C. 154(b) by 831 days.

(21) Appl. No.: 17/763,804

(22) PCT Filed: Sep. 30, 2020

(86) PCT No.: PCT/US2020/053569
§ 371 (c)(1),
(2) Date: Mar. 25, 2022

(87) PCT Pub. No.: WO2021/067455
PCT Pub. Date: Apr. 8, 2021

(65) Prior Publication Data
US 2022/0401952 A1 Dec. 22, 2022

Related U.S. Application Data

(60) Provisional application No. 63/045,996, filed on Jun. 30, 2020, provisional application No. 63/018,508, (Continued)

(51) Int. Cl.
*B01L 3/00* (2006.01)
*C04B 35/645* (2006.01)

(52) U.S. Cl.
CPC .............. *B01L 3/502707* (2013.01); *B01L 3/502715* (2013.01); *C04B 35/6455* (2013.01);
(Continued)

(58) Field of Classification Search
CPC ......... B01L 3/502707; B01L 3/502715; B01L 2200/12; B01L 2300/12; C04B 35/6455;
(Continued)

(56) References Cited

U.S. PATENT DOCUMENTS 4,060,413 A 11/1977 Mazzei et al.
4,732,204 A 3/1988 Tabardin
(Continued)

FOREIGN PATENT DOCUMENTS

CN 1705545 A 12/2005
CN 101590511 A 12/2009
(Continued)

OTHER PUBLICATIONS

Eichler, J, "Intelligent processes enable new products in the field of non-oxide ceramics," Advanced Processing and Manufacturing Technologies for Structural and Multifunctional Materials VII, John Wiley & Sons, Inc., 2016, 6 pages.
(Continued)

*Primary Examiner* — Brian J. Sines

(57) ABSTRACT

A module and a process for forming a monolithic substantially closed-porosity silicon carbide fluidic module having a tortuous fluid passage extending through the module, the tortuous fluid passage having an interior surface, the interior surface having a surface roughness in the range of from 0.1 to 10 μm Ra. The process includes positioning a positive fluid passage mold within a volume of silicon carbide
(Continued)

powder, the powder coated with a binder; pressing the volume of silicon carbide powder with the mold inside to form a pressed body; heating the pressed body to remove the mold; and sintering the pressed body.

20 Claims, 9 Drawing Sheets

Related U.S. Application Data filed on Apr. 30, 2020, provisional application No. 62/908,559, filed on Sep. 30, 2019.

(52) U.S. Cl.
CPC ....... *B01L 2200/12* (2013.01); *B01L 2300/12* (2013.01); *C04B 2235/3826* (2013.01); *C04B 2235/604* (2013.01)

(58) Field of Classification Search
CPC ...... C04B 2235/3826; C04B 2235/604; C04B 2235/602; C04B 2235/6026; C04B 2235/945; C04B 2235/96; C04B 2235/963; C04B 35/575; C04B 35/565; C04B 35/622; C04B 35/638; C04B 35/645; C04B 2235/6562; B01J 2219/00792; B01J 19/0093; B01J 19/24; B01J 2219/2402; B01J 2219/2403; F28D 2021/0022; F28F 7/02

See application file for complete search history.

(56) References Cited

U.S. PATENT DOCUMENTS

| | | | |
|---|---|---|---|
| 5,022,920 A | 6/1991 | Buntrock et al. |
| 5,314,646 A | 5/1994 | Strobel et al. |
| 5,385,700 A | 1/1995 | Denton |
| 6,066,274 A | 5/2000 | Antonson et al. |
| 6,531,423 B1 | 3/2003 | Schwetz et al. |
| 8,087,567 B2 | 1/2012 | Meschke et al. |
| 8,967,238 B2 | 3/2015 | Meschke et al. |
| 9,695,089 B2 | 7/2017 | Lynen et al. |
| 10,272,495 B2 | 4/2019 | Clark |
| 2009/0280299 A1 | 11/2009 | Ferrrato |
| 2010/0279007 A1 | 11/2010 | Briselden et al. |
| 2010/0322829 A1 | 12/2010 | Deny |

FOREIGN PATENT DOCUMENTS

| | | |
|---|---|---|
| CN | 102658352 A | 9/2012 |
| CN | 105458175 A | 4/2016 |
| CN | 105855468 A | 8/2016 |
| CN | 106495667 A | 3/2017 |
| CN | 107685133 A | 2/2018 |
| CN | 108080576 A | 5/2018 |
| CN | 108558408 A | 9/2018 |
| CN | 109311093 A | 2/2019 |
| CN | 109678515 A | 4/2019 |
| CN | 208839570 U | 5/2019 |
| CN | 110434277 A | 11/2019 |
| DE | 4243864 A1 | 7/1993 |
| DE | 102005003197 A1 | 8/2006 |
| EP | 0237400 B1 | 1/1989 |
| EP | 0871555 B1 | 10/2001 |
| GB | 1536748 A | 12/1978 |
| JP | H11-192533 A | 7/1999 |
| JP | 2008-108824 A | 5/2008 |
| JP | 2014-233883 A | 12/2014 |
| WO | 2004/035281 A1 | 4/2004 |
| WO | 2005/037726 A2 | 4/2005 |
| WO | 2017/187133 A1 | 11/2017 |

OTHER PUBLICATIONS

Lewinsohn et al, "Fabrication and Joining of Ceramic Compact Heat Exchangers for Process Integration", 2012, vol. 4, pp. 700-711.
Chinese Patent Application No. 202080080525.4, Office Action dated Jan. 19, 2023, 5 pages (English Translation only), Chinese Patent Office.
Taiwanese Patent Application No. 109134085, Office Action dated Jul. 1, 2024, 2 pages (English Translation only), Taiwanese Patent Office.
Invitation to Pay Additional Fees of the International Searching Authority; PCT/US2020/053569; mailed on Dec. 17, 2020, 10 pages; European Patent Office.
Munro, Ronald G., "Material Properties of a Sintered-SiC", Journal of Physical and Chemical Reference Data, 26, pp. 1195-1203 (1997).

FABRICATION OF FLOW REACTOR MODULES AND MODULES PRODUCED

CROSS-REFERENCE TO RELATED APPLICATIONS

This application claims the benefit of priority under 35 U.S.C. § 371 of International Application No. PCT/US2020/053569, filed on Sep. 30, 2020, which claims the benefit of priority under 35 U.S.C. § 119 of U.S. Provisional Application No. 62/908,559 filed Sep. 30, 2019, which also claims priority to U.S. Provisional Application No. 63/045,996 filed Jun. 30, 2020, which in turn also claims priority to U.S. Provisional Application No. 63/018,508 filed Apr. 30, 2020, the content of each of which is incorporated herein by reference in its entirety.

FIELD OF THE DISCLOSURE

The disclosure relates to methods of fabrication structures comprising silicon carbide, and more particularly to methods fabrication of high density, closed-porosity monolithic silicon carbide structures, particularly high density, closed-porosity monolithic silicon carbide flow reactor fluidic modules, with smooth-surfaced tortuous internal passages extending through or within the structures or fluidic modules, and to the structures or fluidic modules themselves.

BACKGROUND

Silicon carbide ceramic (SiC) is a desirable material for fluidic modules for flow chemistry production and/or laboratory work and for structures for other technical uses. SiC has relatively high thermal conductivity, useful in performing and controlling endothermic or exothermic reactions. SiC has good physical durability and thermal shock resistance. SiC also possesses extremely good chemical resistance. But these properties, combined with high hardness and abrasiveness, make the practical production of SiC structures with internal features, such as SiC flow modules with tortuous internal passages, challenging.

Flow reactors and other structures formed of silicon carbide ceramic are often prepared via a sandwich assembly approach. Green ceramic bodies are pressed into slabs and then shaped, generally on one major surface, using CNC machining, molding, or pressing operations, or the like. After green body firing, two fired slabs are joined together, shaped surfaces facing each other, with or without an intermediate joining layer of ceramic material. In a second firing step the joint is fused (and/or the joining layer densifies) to produce a body with one or more internal channels.

The sandwich assembly joining approach can introduce problems in the fabricated fluidic modules. In modules joined having an intermediate layer, porous interfaces may form at the joining layer. These may trap liquids causing potential for contamination/difficulty cleaning and for mechanical failure (such as by freezing in the pores). Modules joined without intermediate joining layers have required or resulted in inclusion of relatively coarse ceramic grains, producing internal channel surfaces with an undesirable level of roughness.

In another approach, multiple layers of green-state SiC sheets can be produced and cut to shapes required to build up a fluidic module slice-by-slice. Such an approach tends to produces small step-like structures in curved profiles of internal passages. For emptying and cleaning/purging of fluidic modules, the wall profiles of internal passages are desirably smooth and free from small step-like structures.

Accordingly, there is a need for SiC fluidic modules and other SiC structures, and methods of fabricating SiC fluidic modules and other SiC structures, with internal passages having improved internal-passage surface properties, specifically: low porosity generally, or no significant porous interfaces at a seal location, low surface roughness, and smooth wall profiles.

SUMMARY OF THE DISCLOSURE

According to some aspects of the present disclosure, a monolithic substantially closed-porosity silicon carbide structure, such as a fluidic module, is provided, having a tortuous fluid passage extending within the structure or through the module, the tortuous fluid passage having an interior surface, the interior surface having a surface roughness in the range of from 0.1 to 80 μm Ra.

According to some additional aspects of the present disclosure, a process for forming a monolithic substantially closed-porosity silicon carbide structure or fluidic module is provided, the process comprising positioning a positive mold such as a positive fluid passage mold within a volume of silicon carbide powder, the powder coated with a binder; pressing the volume of silicon carbide powder with the mold inside to form a pressed body; heating the pressed body to remove the mold; and sintering the pressed body to form a monolithic silicon carbide structure or fluidic module having a tortuous fluid passage within or extending therethrough.

The structure or module of the present disclosure has very low open porosity (as low as 0.1% or less) and low roughness of the tortuous passage interior surface (as low as 0.1 μm Ra). This provides a structure or fluidic module with an internal passage resistant to infiltration by fluids. For flow modules, the module is thus easily cleanable, with low pressure drop during use. During use, fluidic boundary layers near the smooth interior wall surface of the flow modules are thin relative to boundary layers resulting from rougher surfaces, providing better mixing and heat exchange performance.

According to further aspects of the present disclosure, a process for forming a silicon carbide structure or more specifically, a silicon carbide fluidic module for a flow reactor is provided. The process comprises positioning a positive mold such as a fluid passage mold of a passage having a tortuous shape within a volume of powder-coated silicon carbide powder, pressing the volume of silicon carbide powder with the mold inside to form a pressed body, heating the pressed body to remove the mold; and sintering the pressed body to form a monolithic silicon carbide fluidic module having a tortuous fluid passage extending therethrough. The pressing can comprise uniaxial pressing. The pressing can comprise isostatic pressing in an isostatic press. The heating the pressed body to remove the mold can comprise a second or a continued pressing the pressed body while heating the pressed body. Where the initial pressing is performed in an isostatic press, the second or continued pressing may be performed in the same press.

The process can also include, before sintering the pressed body, debinding the pressed body. The process can also include forming a positive passage mold of a passage having a tortuous shape by molding the passage mold, or by 3-D printing the passage mold. According to one alternative, forming the positive passage mold may also include forming a positive passage mold having an outer layer of lower melting material, the lower melting material having a melting point lower than a melting point of a remainder of the positive passage mold. The melting point of the lower melting material can be lower than the melting point of the remainder of the positive passage mold by at least 5° C.

The disclosed methods and variations thereof allow the practical production of the silicon carbide structures, such as silicon carbide fluidic modules, having the desirable features mentioned above.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the disclosure and the appended claims.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following embodiments.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1:
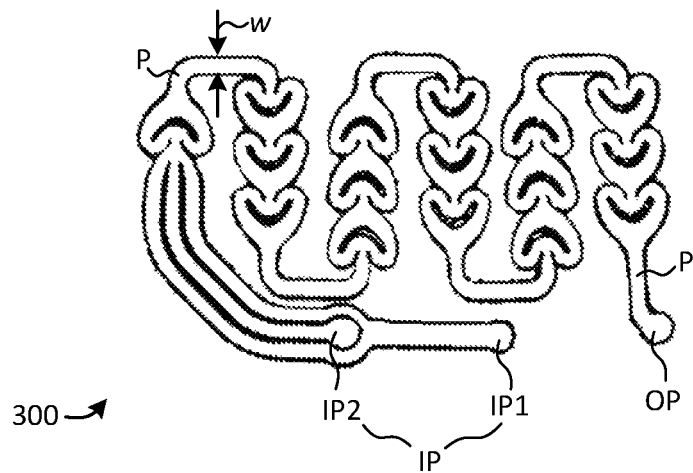
FIG. 1 is a diagrammatic plan view outline of a fluidic passage of a type useful in flow reactor fluidic modules showing certain features of the fluidic passage.

Additional features and advantages will be set forth in the detailed description which follows and will be apparent to those skilled in the art from the description or recognized by practicing the embodiments as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom, above, below, and the like—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, a "tortuous" passage refers to a passage having no line of sight directly through the passage and with a path of the passage having at least two differing radii of curvature, the path of the passage being defined mathematically and geometrically as a curve formed by successive geometric centers, along the passage, of successive minimum-area planar cross sections of the passage (that is, the angle of a given planar cross section is the angle which produces a minimum area of the planar cross section at the particular location along the passage) taken at arbitrarily closely spaced successive positions along the passage. Typical machining-based forming techniques are generally inadequate to form such a tortuous passage. Such passages may include a division or divisions of a passage into subpassages (with corresponding subpaths) and a recombination or recombinations of subpassages (and corresponding subpaths).

Figure 3:
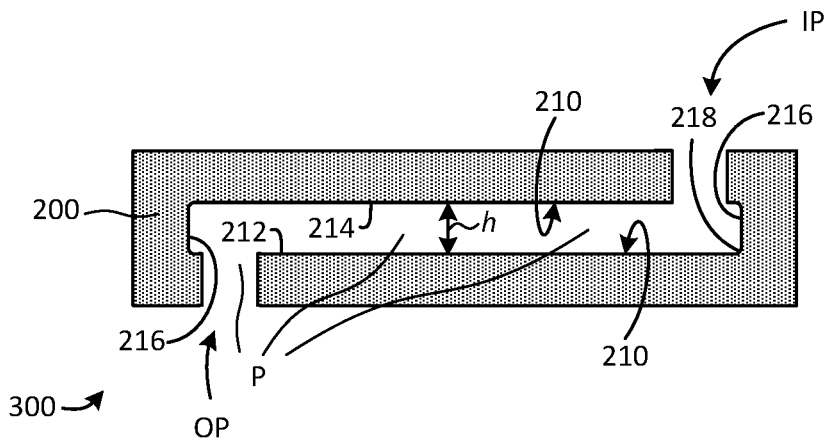
FIG. 3 is a diagrammatic cross-sectional view of an embodiment of a fluidic module of the present disclosure.

As used herein a "monolithic" silicon carbide structure of course does not imply zero inhomogeneities in the ceramic structure at all scales. A "monolithic" silicon carbide structure or a "monolithic" silicon carbide fluidic module, as the term "monolithic" is defined herein, refers to a silicon carbide structure or fluidic module, with one or more tortuous passages extending therethrough, in which no (other than the passage(s)) inhomogeneities, openings, or interconnected porosities are present in the ceramic structure having a length greater than the average perpendicular depth d of the one or more passages P from the external surface of the structure or module 300, as shown in FIG. 3. Providing such a monolithic silicon carbide structure or monolithic silicon carbide flow module helps ensure fluid tightness and good pressure resistance of a flow reactor fluidic module or similar product.

Figure 2:
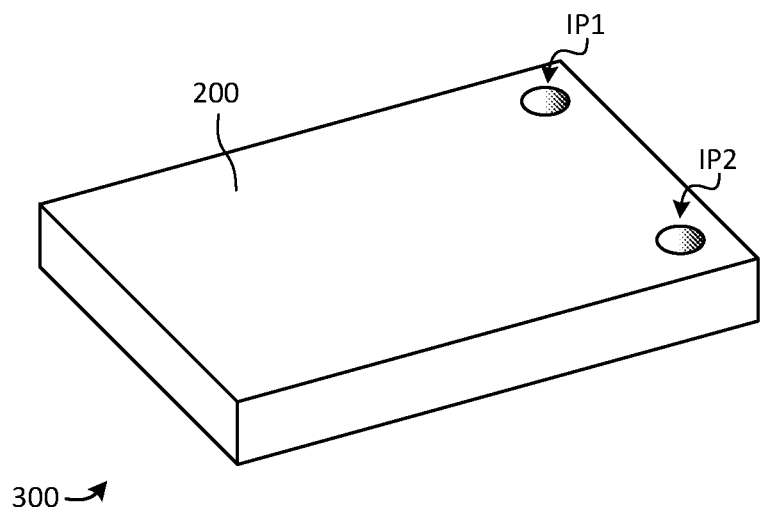
FIG. 2 is a perspective external view of an embodiment of a fluidic module of the present disclosure.

With reference to FIGS. 1-3, a silicon carbide flow reactor fluidic module 300 is disclosed. The module 300 comprises a monolithic closed-porosity silicon carbide body 200 and a tortuous fluid passage P extending through the silicon carbide body 200. The tortuous fluid passage P has an interior surface 210. The interior surface 210 has a surface roughness in the range of from 0.1 to 80 µm Ra, or 0.1 to 50, 0.1 to 40, 0.1 to 30, 0.1 to 20, 0.1 to 10, 0.1 to 5, or even 0.1 to 1 µm Ra, generally lower than silicon carbide fluidic modules have previously achieved.

According to further embodiments, the silicon carbide body 200 of the fluidic module 300 has a density of at least 95% of a theoretical maximum density of silicon carbide, or even of at least 96, 97, 98, or 99% of theoretical maximum density.

According to further embodiments, the silicon carbide body 200 of the fluidic module 300 has an open porosity of less than 1%, or even of less than 0.5%, 0.4%, 0.2% or 0.1%.

According to still further embodiments, the silicon carbide body 200 of the module 300 has an internal pressure resistance under pressurized water testing of at least 50 bar, or even at least 100 bar, or 150 bar.

The tortuous fluid passage P, according to embodiments, comprises a floor 212 and a ceiling 214 separated by a height h and two opposing sidewalls 216 joining the floor 212 and the ceiling 214. The sidewalls are separated by a width w (FIG. 1) measured perpendicular to the height h and the direction along the passage (corresponding to the predominant flow direction when in use). Further, width w is measured at a position corresponding to one-half of the height h. According to embodiments, the height h of the tortuous fluid passage is in the range of from 0.1 to 20 mm, or from 0.2 to 15, or 0.3 to 12 mm.

According to embodiments, the interior surface 210 of the fluidic passage P where the sidewalls 216 meet the floor 212 has a radius curvature (at reference 218) of greater than or equal to 0.1 mm, or greater than or equal to 0.3, or even greater than or equal to 0.6 mm, or 1 mm or 1 mm, 1 cm or 2 cm.

Figure 4:
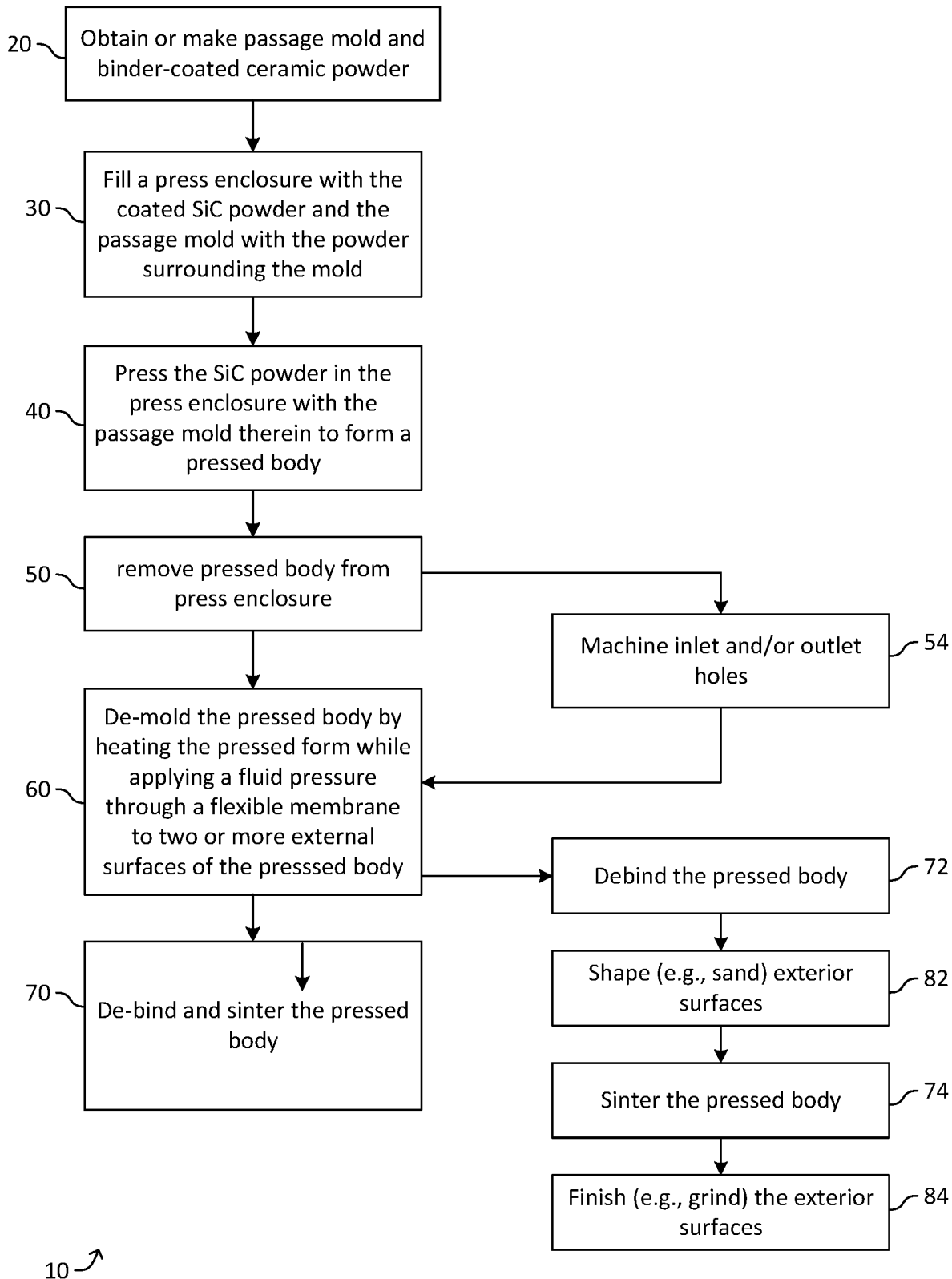
FIG. 4 is a flow chart showing some embodiments of a method for producing a fluidic module of the present disclosure.
Figure 5:
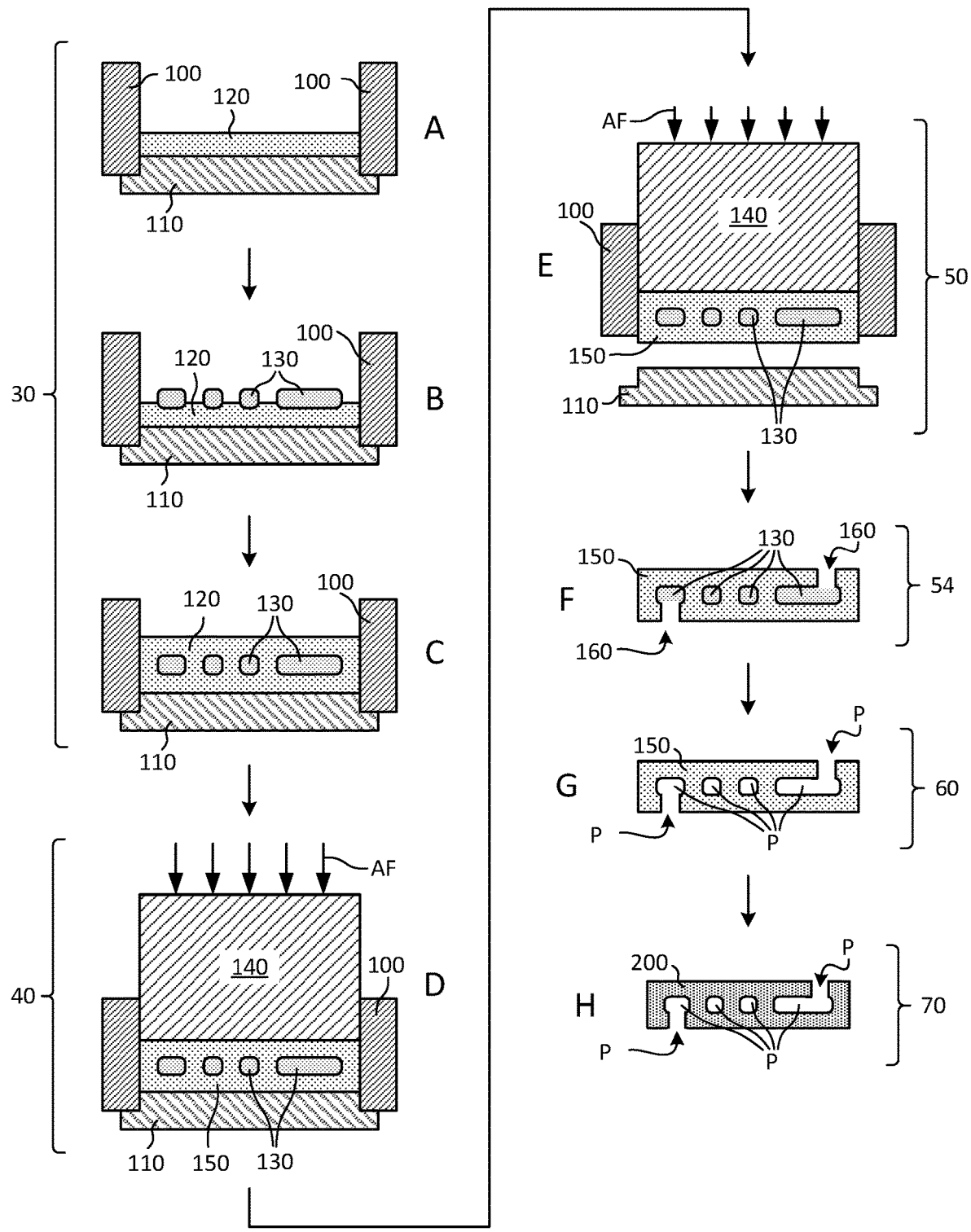
FIG. 5 is a step-wise series of cross-sectional representations of some embodiments of the method(s) described in FIG. 4.

With reference to FIGS. 4 and 5, according to embodiments, a process for forming a silicon carbide module for a flow reactor having one or more of these or other desirable properties can include the step 20 of obtaining or making a passage mold and a binder-coated SiC powder (such powders are commercially available from various suppliers). The passage mold can be obtained by molding, machining, 3D printing, or other suitable forming techniques or combinations thereof. The material of the passage mold is desirably a relatively incompressible material. The material of the passage mold can be a thermoplastic material.

The process further can include the step of (partially) filling a press enclosure (or die) 100, the press enclosure 100 being closed with a plug 110, with binder-coated SiC powder 120, as described in step 30 of FIG. 4 and as represented in the cross section of FIG. 5A. Next, the passage mold 130 is placed on/in the SiC powder 120 (FIG. 5B) and an additional amount of SiC powder is put on top of the passage mold 130, such that the SiC powder 120 surrounds the passage mold 130 (FIG. 5C, step 30 of FIG. 4). Next, a piston or ram 140 is inserted in the press enclosure 100 and a uniaxial force AF is applied from above to compress the SiC powder 120 with the passage mold 130 inside (FIG. 5D and FIG. 4 step 40) to form a pressed body 150. A reaction force or equal counteracting force AF (not shown) is supplied at the plug 110 during this step.) Next, with plug 110 now free to move, the pressed body 150 is removed by a (smaller) force AF applied to the piston 140 (FIG. 5E, step 50 of FIG. 4).

Next, the pressed body 150, now free from the press enclosure 100, is machined in selected locations, such as by drilling, to form holes or fluidic ports 160 extending from the outside of the pressed body 150 to the passage mold 130 (FIG. 5F, step 54 of FIG. 4). Note that this is an optional step, because the holes can, an another alternative, be formed using a mold which includes the shape of the holes or fluidic ports as part of the mold. Also, as still another variation, drilling may be postponed and used as part of the de-molding step 60 described below.

Next, the pressed body 150 is heated, preferably at a relatively high rate, such that the passage mold 130 is melted and removed from the pressed body 150 by flowing out of the pressed body 150, and/or by being blown and/or sucked out in addition. (FIG. 5G, step 60 of FIG. 4). As yet another alternative, this step 60 can be divided into two parts, where first the pressed body is heated, and then next, separately, the wax is allowed to flow out of the body. It is also possible, in yet another alternative to de-mold the sample by heating the pressed body 150 to melt mold, and only then drill holes or fluidic ports, while the body is still hot, allowing the mold material to flow out and complete demolding in this manner. The heating may be under partial vacuum, if desired.

Finally, the pressed body 150 is de-bound to remove SiC powder binder, and then fired (sintered) to densify and further solidify the pressed body into a monolithic silicon carbide body 200. (FIG. 5H, step 70 of FIG. 4).

As shown in the flowchart of FIG. 4, additional or alternative steps can include step 72, debinding, step 82, shaping or preliminarily shaping the exterior surface(s), such as by sanding or other machining before sintering, and step 84, finishing the exterior surface(s), such as by grinding, after sintering.

Sintering can be performed as specified or recommended by the supplier of the coated SiC powder. Such suppliers include, for example, Panadyne Inc. (Montgomeryville, PA, USA), GNP Ceramics (Buffalo, NY, USA), H. C. Starck (Hermsdorf, Germany), and IKH (Industriekeramik Hochrhein GmbH) (Wutöschingen, Germany). One example of a debinding and firing cycles (performed in succession in one chamber or individually) can include three steps: (1) curing of the binder, such as at a temperature of 150+/−25° C., in air, to strengthen or stiffen the binder; (2) debinding at 600+/−25° C., in a non-oxygenating environment such as in $N_2$; Sintering at 2100+/−50° C. in a non-oxygenating environment, such as in Ar. An example of a time, temperature, gas, and ramp rate table is given in the Table below:

TABLE

| Total time (hr) | Segment time (hr) | Target temperature (° C.) | Heating Rate (° C./min) | Ambient gas |
|---|---|---|---|---|
| 0.0 | 0 | 25 |  | Air |
| 2.3 | 2.3 | 150 | 2 | Air |
| 5.3 | 3.0 | 150 | 3 | Air |
| 7.8 | 2.5 | 600 | 2 | N2 |
| 10.8 | 3.0 | 600 | 3 | N2 |
| 15.6 | 4.8 | 25 | 2 | N2 |

Figure 6:
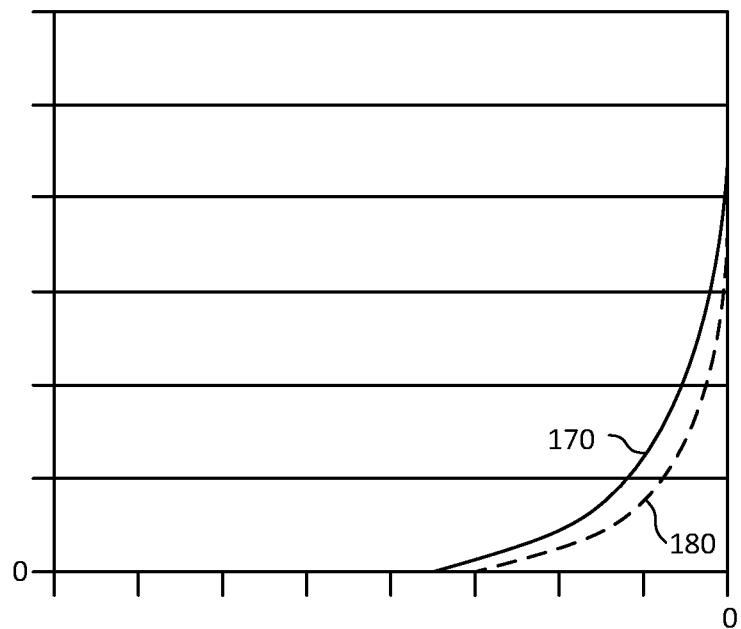
FIG. 6 is a graph illustrating compression release curves useful in practicing the methods of the present disclosure.

FIG. 6 is a graph illustrating compression release curves useful in practicing the methods of the present disclosure, in particular, showing a desirable relationship between the compression release property of the SiC powder 120 and the passage mold 130. Specifically, a compression release curve 170 of the SiC powder material, graphed in units of distance (x axis) vs. force (y axis) (arbitrary units shown) (time evolution is downward and leftward) should preferably lie above a compression release curve 180 of the material of the passage mold 130. The compression curve, not shown, is not particularly significant. But using a relatively incompressible mold material such that the SiC compression release curve 170 lies above the passage mold compression release curve 180 helps maintain the structural integrity of the pressed body during steps subsequent to pressing. Further, to achieve the smooth internal passage walls, coated SiC powder with generally smaller particle sizes is preferred, as are passage mold materials having generally higher hardness.

Figure 7:
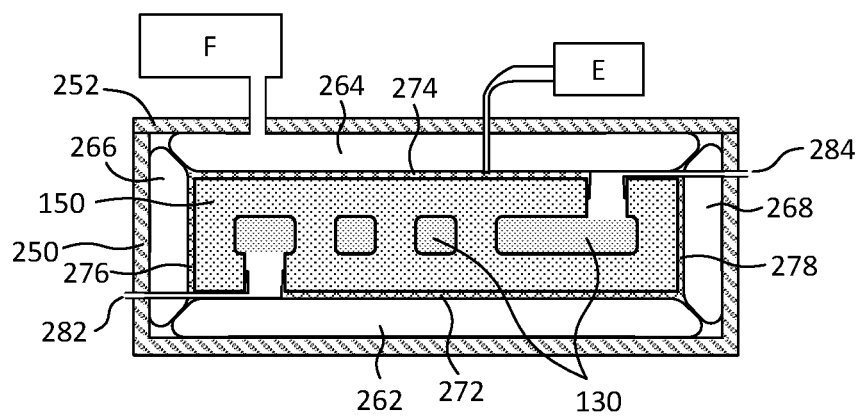
FIG. 7 is a cross-sectional representation of an embodiment of an apparatus for performing the pressing step and/or the demolding step of the method of FIG. 4.

FIG. 7 shows in a cross-sectional representation one an embodiment of an apparatus 400 for performing the demolding step 60 of FIG. 4 while applying pressure to the outside of the pressed body 150, or optionally, for performing the pressing step 40, or optionally, for performing both the pressing step 40 and the demolding step 60.

As used for embodiments of the demolding step 60 in which pressure is applied to the pressed body 150 during demolding, the apparatus 400 is in the form of a press or optionally of an isostatic or quasi-isostatic press and comprises an openable and closeable frame 250, such as with a lid 252 or other means of opening and closing, and with an interior and exterior. One or more flexible membranes 262, 264, 266, 268 are positioned within the frame 250 and have a first surface facing the interior of the frame 250 and a second surface (directly) opposite the first surface, the second surface forming at least part of an enclosed volume having fluid lines, connections, ports, or the like, connected or to be connected to a supply of pressurized fluid F. The apparatus 400 also optionally includes a clearance or a pathway or a port or conduit 282, 284 or the like through which the material of a mold 130 can drain when melted from the from a green state powder pressed ceramic body 150 while a pressure is applied to the green state powder pressed ceramic body 150 by a fluid, through the one or more flexible membranes 262, 264, 266, 268. The fluid supplied by fluid source F can be, according to embodiments, a heated liquid which supplies energy to the mold material by heating the green state powder pressed ceramic body 150.

In alternative embodiments, the fluid source F may supplied gas under pressure such as compressed air or nitrogen, and the apparatus 400 can also include one or more flexible heating pads 272, 274, 276, 278 positioned on the first surface of the one or more flexible membranes 262, 264, 266, 268. A flexible heating pad of the apparatus can comprise (1) multiple zones in which input energy can be individually controlled and/or (2) multiple individually energizeable smaller heating pads, not shown, to which energy can be supplied by a source E of electrical energy.

In operation for demolding, in the apparatus of FIG. 7 or similar embodiments, energy is applied to the internal mold 130 within the green state powder pressed ceramic body 150 to melt a material of the internal mold while at the same time a fluid pressure is applied through one or more flexible membranes to at least two opposite external surfaces (to the two largest surfaces) of the green state powder pressed ceramic body 150, while one or more of (1) allowing the melted mold material to drain from green state powder pressed ceramic body, (2) blowing the melted mold material from green state powder pressed ceramic body, and (3) sucking the melted mold material from green state powder pressed ceramic body to remove the mold. Alternatively, the mold material may be melted while the pressed body 150 is under pressure, but the melted mold material can be allowed to flow out after the pressure is removed, such as after the pressed body 150 is removed from the apparatus 400. Energy can be applied to the internal mold by heating the mold by heating the green state powder pressed ceramic body. If equal pressure is applied to every side of the green state powder pressed ceramic body, such as by having individual flexible membranes on every side, isostatic or quasi-isostatic pressure can be applied.

According to additional alternative aspects of the present invention, the press apparatus 400 of FIG. 7 may be used, alternatively or in addition, to perform the pressing step 40 of the method of FIG. 4. During such pressing, the SiC powder (before pressing) or the resulting pressed body (during and after pressing) is not heated because the mold should remain solid and unmelted during the pressing step 40. Pressures in the range of from 10 MPa to 300 MPa, desirably 20 MPa to 150 MPa or more specifically 30 MPa to 50 MPa may be used during pressing, while pressures during demolding are much lower, desirably in the range of from 0.3 MPa to 20 MPa, 1 MPa to 10 MPa, or most specifically from 3 MPa to 5 MPa. Accordingly, if apparatus 400 is used for both pressing and demolding, there should be a depressurization from the high pressure used for pressing to the lower pressure used for demolding generally before any significant heating of the mold takes place.

According to additional embodiments of the present invention, the flexible membrane through which pressure is applied for demolding or both pressing and demolding may take the form of a fluid-tight bag enclosing the green state powder pressed ceramic body—as is more typical of isostatic pressing practice—rather two or more multiple membranes arranged around the powder and resulting pressed body 150 as in FIG. 7. In this case, the internal space between the interior of the frame and the exterior of the fluid-tight bag enclosing the green state powder pressed ceramic body is filled with pressurized fluid F.

Figure 8:
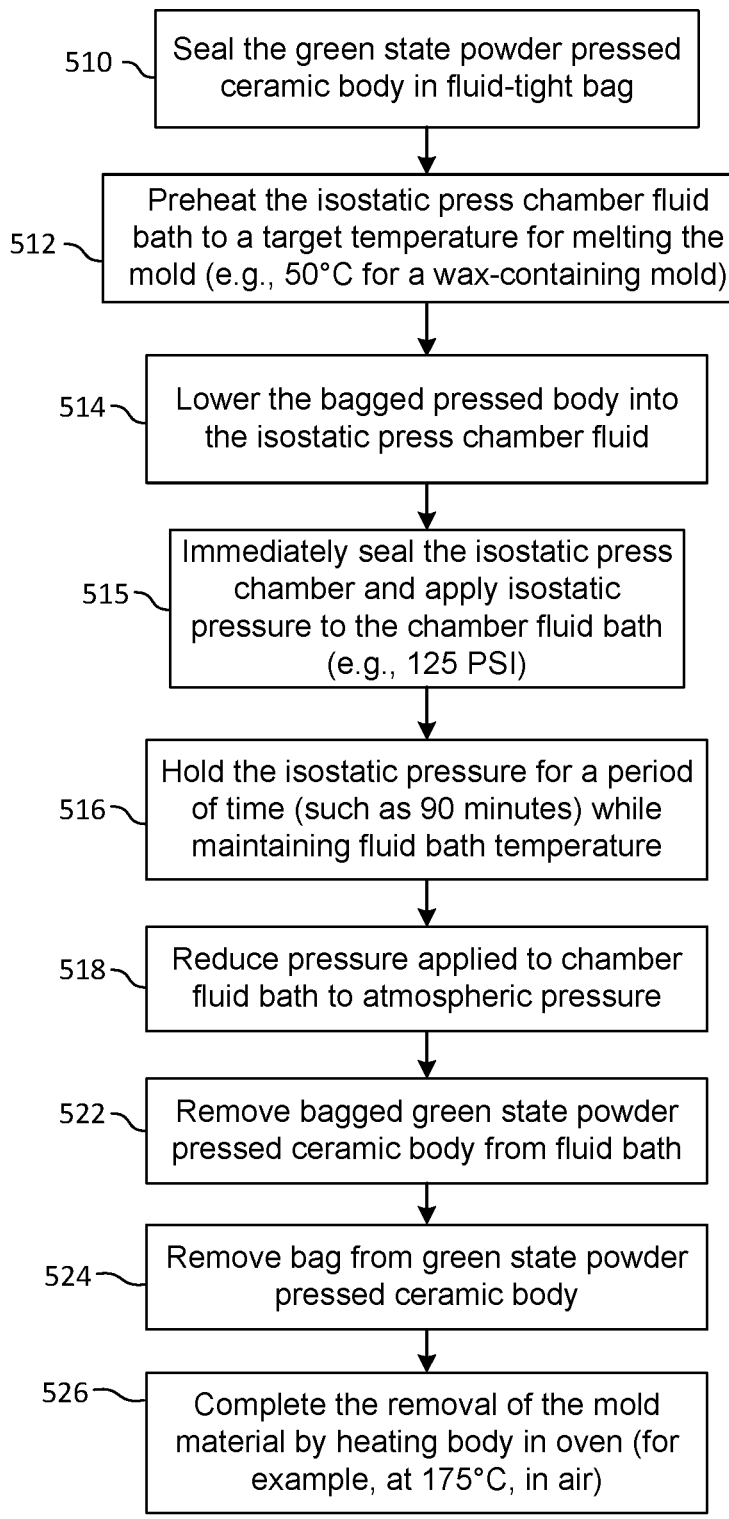
FIG. 8 is a flow chart of an embodiment of a process by which demolding can be performed with pressure applied through a fluid-tight bag enclosing a green state powder pressed ceramic body.
Figure 9:
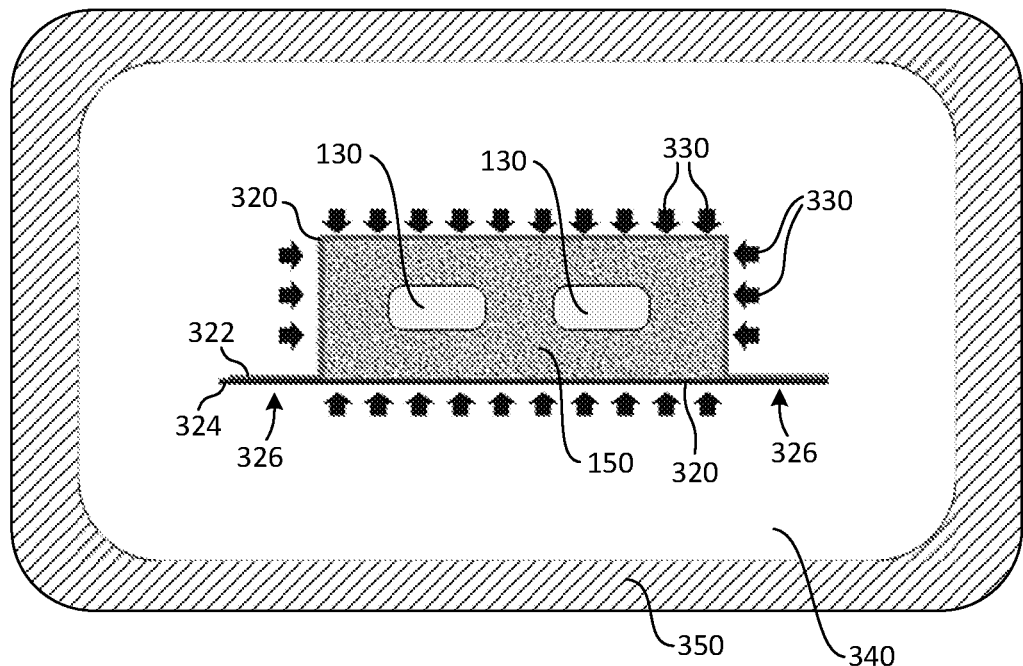
FIG. 9 is a cross-sectional representation of an embodiment of an apparatus for use in performing the pressing step and/or the demolding step of the method of FIG. 4 and or the demolding of FIG. 8.

Process steps for one embodiment of demolding green pressed fluidic modules according to this aspect are shown in the flow chart of FIG. 8, and a cross-sectional representation of an isostatic press apparatus for use in performing the process is shown in FIG. 9. With reference to both figures, the process 500 includes step 510 of sealing a green state powder pressed ceramic body 150, with one or more internal passage molds 130 inside, in fluid-tight bag 320. As seen in FIG. 9, the bag 320 can include a top layer 322 and a bottom layer 324 sealed together at a seal region 326, such as by pinching together and heating top and bottom layers 322, 324 which can be formed of polymer. Multiple rows of thermally produced seals can be used in the seal region 326 if desired. Vacuum sealing can be used and is preferred but not required—successful tests have been performed with and without vacuum sealing. The bag is fluid-tight to the fluid 340 in the chamber 350, which can be, for example, water.

Further in FIG. 9, a press chamber 350 holds a fluid which is, in step 512 of the process 500, desirably preheated to a target temperature for melting the mold (for example, to 50° C. for a wax-based mold). In step 514 the bag 320 with the green state powder pressed ceramic body 150 sealed inside is then lowered into the isostatic press chamber fluid 340. Next in step 515, the isostatic press chamber is closed and sealed and pressure is applied to the chamber fluid (e.g., in the range of 100-600 PSI), producing essentially isostatic pressure on all surfaces of the body 150. In step 516, the pressure and temperature are maintained for a period of time, such as 90 minutes, to melt the material of the passage mold 130.

As mentioned, the passage mold can be a wax-based material. As the green state powder pressed ceramic body 150 is heated by the warm fluid, the passage mold(s) 130 are also heated, and the mold material begins expanding, softening, and melting. The expansion produces an outward force on the interior walls of the passages within the body 150. The outward force is counteracted and/or balanced, at least in part, by the isostatic pressing force, represented by the arrows 330, applied to the exterior surface of the body 150 through the bag 320.

The melted mold material can move into optional ports such as ports IP1, IP2, IP, OP shown in FIGS. 1 and 2, or into vents or other passages, not shown in FIG. 8, specifically provided therefor. Also, as the mold material melts, its viscosity can be reduced to the degree that it can flow into the small gaps between powder granules of the body 150 in the region around the internal passage(s).

After the time period of step 516 is ended, the pressure inside the chamber 350 is reduced to atmospheric pressure in step 518, the chamber is opened and the bag 320 and body 150 are removed in step 522, and the bag 320 is removed from the body 150 in step 524. During steps 522 and 524, the body is preferably kept sufficiently warm (for example, at 50° C. or greater) to prevent re-solidification of the mold material, until any remaining mold material is completely removed, such as by heating the body 150 in an oven (for example, at 175° C., in air), in step 526. While heating, the body can be oriented to allow the mold material to drain out through one or more ports IP1, IP2, IP, OP.

Figure 10:
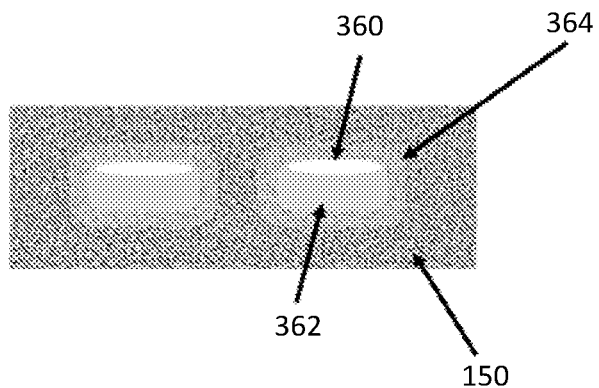
FIGS. 10 and 11 are cross-sectional representations of forms the green state powder pressed ceramic body and mold material may take during and after demolding such as by the process according to FIG. 8.
Figure 11:
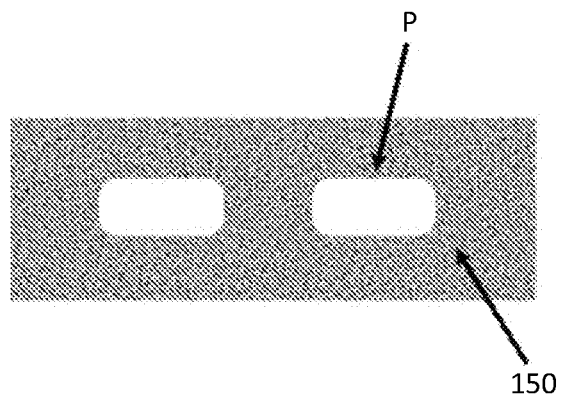

Prior to heating the body 150 in an oven in step 526, the body and the mold material may be in a state general depicted in the cross section of FIG. 9. As shown in FIG. 10, voids 360 may appear due to migration of mold material into ports or vents (not shown) and/or into a region 364 of the body 150 surrounding the internal passages. After the heating of step 526, the mold(s) 130 have been completely removed from the passage(s) P and from the body 150, as shown in the cross section of FIG. 11. As an alternative to heating in an oven as a separate step, the remaining mold material can be volatilized and removed during the early stages of firing the pressed body (prior to or as part of debinding and consolidation of the pressed body) before sintering.

Figure 12:
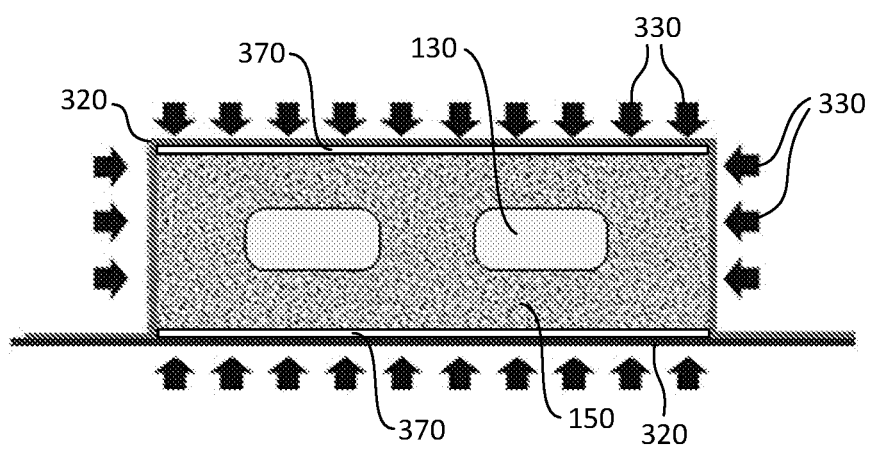
FIG. 12 is a cross section of an additional or alternative embodiment of elements of the apparatus of FIG. 9.

According to another and alternative aspect of the present disclosure shown in the cross section of FIG. 12, force-distribution plates 370 may be positioned between the body 150 and the bag 320. These plates 30, in the form of flexible metal or polymer sheets, for example, 370 can distribute the localized forces of the isostatic pressure across a wider area of the body 150 to prevent any tendency of that pressure to collapse the internal fluid passage(s) during demolding as the material of the mold(s) 130 melts. Such plates can be useful, in particular, on surfaces of the body which lie parallel to the larger dimension of the passage(s) 130, as shown in FIG. 12.

As discussed above with respect to the embodiment of FIG. 7, heaters may optionally be used, particularly if gas is used as the pressurizing fluid rather than liquid, which may be in addition to or incorporated into force-distribution plates 370, for example.

As also discussed with respect to the embodiment of FIG. 7, the isostatic press chamber 350 of FIG. 9 may similarly be used, alternatively or in addition, to perform the pressing of the SiC powder to form the pressed body 150 as in step 40 of FIG. 3.

Figure 13:
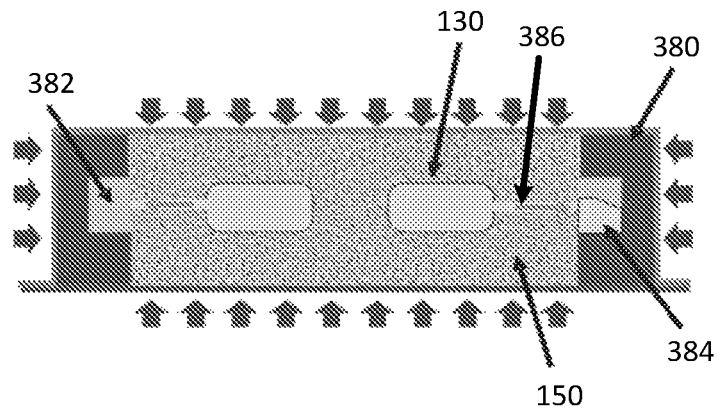
FIG. 13 is a cross section of another additional or alternative embodiment of elements of the apparatus of FIG. 9.

The cross section of FIG. 13 depicts additional or alternative features which can be used to provide for and/or assist with removal of melted mold material, whether in the press apparatus of FIG. 7 or in the isostatic pressing chamber of FIG. 9. As seen in FIG. 13, one or more reservoir frames 380 may be positioned against one or more outer surfaces of the body 150. Reservoir frames 380 include a relatively large surface area in contact with the body 150 and reservoirs 382 within the reservoir frames 380. One or more ports or vents 386 for outflow of mold material lead from the internal passage molds 130 to the reservoirs 382. The surface area at which reservoir frames 380 contact the body 150 transfers pressure to the body 150, while the reservoirs 382 receive melted mold material 384 as the mold material softens and flows.

Figure 14:
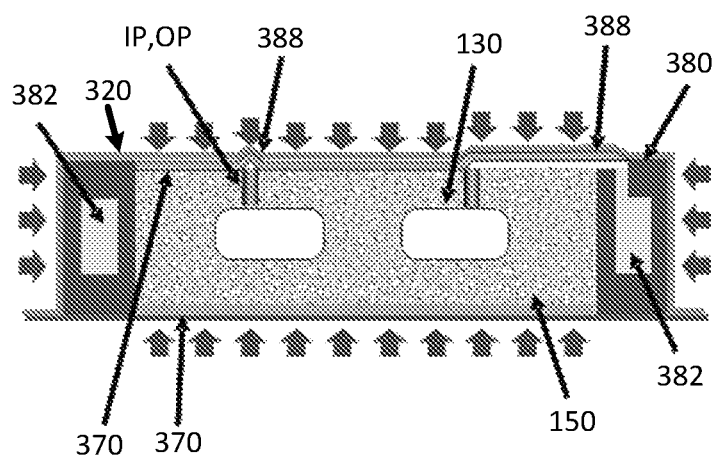
FIG. 14 is a cross section of yet another additional or alternative embodiment of elements of the apparatus of FIG. 9.

In another additional or alternative aspect, as an alternative to the one or more ports or vents 386 FIG. 14, one or more ridges 388 or "ridge channels" 388 (ridges which form a channel beneath the ridge) may be included one or more of the force distribution plates 370, to allow for flow of melted mold material along the ridge channel 388 to an associated reservoir frame 380. As shown in the figure, the reservoir frames 380 in this aspect can have full contact with the side of the body 150 against which they are positioned, with an opening into the reservoir on an adjoining face of the reservoir frame 380.

According to yet another alternative embodiment representable by FIGS. 13 and 14, in case a pressure differential is desired to assist in removing the mold but no pathway to the outside of the pressure tight bag 320 and the associated pressure chamber 350 is desired or is available, one or more of the chambers 382 of FIGS. 13 and 14 may be filled in part with a liquid that, when heated, along with the rest of the body 150, will apply a vapor pressure to the mold material from the direction of the one or more of the chambers 382. One or more other chambers 382, 384 contain no liquid and are thus able to receive the melted mold material driven toward these chambers by the vapor pressure.

According to still another alternative embodiment representable by FIGS. 13 and 14, in case a pressure differential is desired to assist in removing the mold but no pathway to the outside of the pressure tight bag 320 and the associated pressure chamber 350 is desired or is available, and in cases where the embodiments shown are used for demolding only and not additionally for the pressing step, one or more of the chambers 382 of FIGS. 13 and 14 may formed of or may include a compressible material such that when the chamber is placed under isostatic pressure together with the body 150, the chamber be compressed, producing a gas pressure on the mold material from the direction of the one or more of the chambers 382. One or more other chambers 382, 384 are not compressible and are thus able to receive the melted mold material driven toward them by the compression of the compressible chambers.

Figure 15:
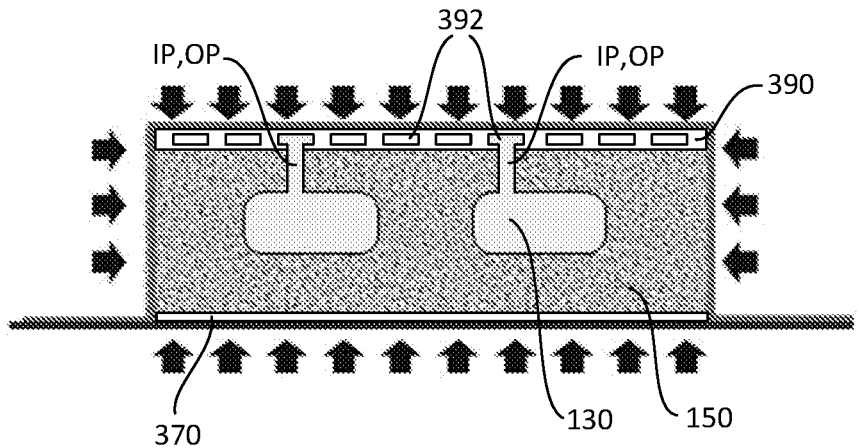
FIG. 15 is a cross section of still another additional or alternative embodiment of elements of the apparatus of FIG. 9.

In yet another additional or alternative aspect shown in the cross section of FIG. 15, a force distribution plate 390 with cavities 392 can be employed on one or more surfaces of the body 150. The cavities 392 are interconnected (in a plane other than the cross-section shown) and input or output ports IP, OP are aligned with one or more of the cavities 392. Melted mold material from the passage mold(s) 130 can then flow into the cavities 392 as the mold material softens and flows.

Figure 16:
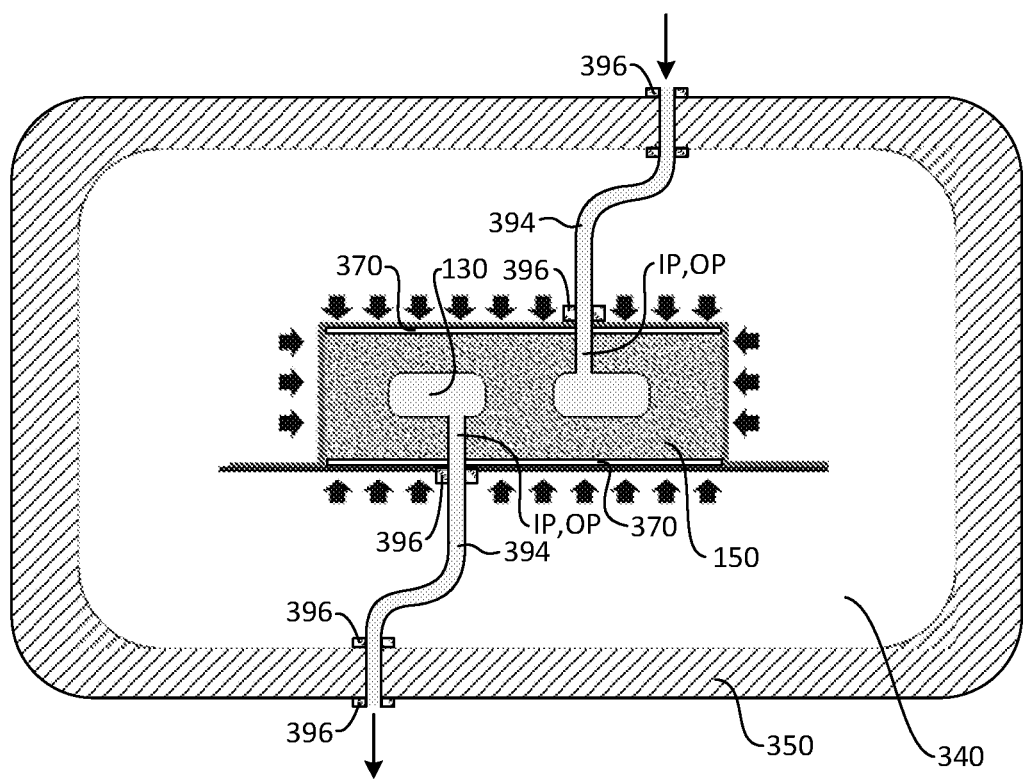
FIG. 16 is a cross section of still one more additional or alternative embodiment of elements of the apparatus of FIG. 9.

In still another additional or alternative aspect shown in the cross section of FIG. 16, one or more tubes 394, can be used, joined at one end to the input or output ports and extending out through the of the chamber 350, with seals 396 maintaining fluid tightness. In this aspect, pressure can be applied (as represented by the arrow at the top of the figure) or vacuum can be applied (as represented by the arrow at the bottom of the figure), or both to assist in the removal of melted mold material.

Mold Materials and Mold Formation

As mentioned above, the passage mold can be obtained by molding, machining, 3D printing, or other suitable forming techniques or combinations thereof. The material of the passage mold can be an organic material such as an organic thermoplastic. The mold material may include organic or inorganic particles suspended or otherwise distributed within the material as one way of decreasing expansion during heating/melting. As mentioned, the material of the passage mold is desirably a relatively incompressible material—specifically a material with low rebound after compression relative to the rebound of the pressed SiC powder after compression, as explained above in connection with FIG. 6. Mold materials loaded with particles can exhibit lower rebound after compression. Mold materials which are capable of some degree of non-elastic deformation under compression also naturally tend to have low rebound (e.g., materials with high loss modulus). Polymer substances with little or no cross-linking, for example, and/or materials with some local hardness or brittleness which enables localized fracturing or micro-fracturing upon compression can exhibit low rebound. Useful mold materials can include waxes with suspended particles such as carbon and/or inorganic particles, rosin containing waxes, high modulus brittle thermoplastics, and even organic solids suspended in organic fats such as cocoa powder in cocoa butter—or combinations of these. Low melting point metal alloys also may be useful as mold materials, particularly alloys having low or no expansion on melting.

As the mold is heated to be melted and removed, the mold material can potentially expand more than is desirable before sufficiently low viscosity is reached for the mold material to flow away and relieve the pressure of expansion. If the pressure generated during mold removal is excessive, the passage being formed may be damaged. As an additional alternative embodiment addressing this potential issue, a mold may be used which has an outer layer of lower melting material having a melting point than the rest or inner portion of the mold. By selecting a lower melting material having a sufficiently lower melting point then the remainder of the mold, when the mold is heated to remove the mold, the outer layer can transition to low viscosity before the mold as a whole has expanded significantly, and the outer layer can then flow away as the remainder of the mold is further heated and expands then melts, relieving pressure that may otherwise be undesirably high. Melting point separation between the low melting material melting point and the melting of the remainder of the mold is desirably at least 5° C., or even 20° C. or even 40° C. but generally not more than 80° C. The outer layer can be formed by a second molding or by dipping or the like.

The devices disclosed and/or produced by the methods disclosed herein are generally useful in performing any process that involves mixing, separation including reactive separation, extraction, crystallization, precipitation, or otherwise processing fluids or mixtures of fluids, including multiphase mixtures of fluids—and including fluids or mixtures of fluids including multiphase mixtures of fluids that also contain solids—within a microstructure. The processing may include a physical process, a chemical reaction defined as a process that results in the interconversion of organic, inorganic, or both organic and inorganic species, a biochemical process, or any other form of processing. The following non-limiting list of reactions may be performed with the disclosed methods and/or devices: oxidation; reduction; substitution; elimination; addition; ligand exchange; metal exchange; and ion exchange. More specifically, reactions of any of the following non-limiting list may be performed with the disclosed methods and/or devices: polymerisation; alkylation; dealkylation; nitration; peroxidation; sulfoxidation; epoxidation; ammoxidation; hydrogenation; dehydrogenation; organometallic reactions; precious metal chemistry/homogeneous catalyst reactions; carbonylation; thiocarbonylation; alkoxylation; halogenation; dehydrohalogenation; dehalogenation; hydroformylation; carboxylation; decarboxylation; amination; arylation; peptide coupling; aldol condensation; cyclocondensation; dehydrocyclization; esterification; amidation; heterocyclic synthesis; dehydration; alcoholysis; hydrolysis; ammonolysis; etherification; enzymatic synthesis; ketalization; saponification; isomerisation; quaternization; formylation; phase transfer reactions; silylations; nitrile synthesis; phosphorylation; ozonolysis; azide chemistry; metathesis; hydrosilylation; coupling reactions; and enzymatic reactions.

The process disclosed and the structures producible can be extended to additional fields of application, in that a silicon carbide structure can be provided, the structure comprising a monolithic closed-porosity silicon carbide body; and a tortuous fluid passage extending within the silicon carbide body, the tortuous fluid passage having an interior surface, with the interior surface having a surface roughness of less than 10 μm Ra, or in the range of from 0.1 to 5 μm Ra, or in the range of from 0.1 to 1 μm Ra.

The silicon carbide of the structure has a density of at least 95, 96, 97, 98 or even 99% of officially published US government standard theoretical maximum density (or the average of any such, in the case of multiple) for silicon carbide. The has an open porosity of less than 1%, less than 0.5%, or less than 0.1%.

An internal pressure resistance of the structure under pressurized water testing can be at least 50 bar, or at least 100 bar, or at least 150 bar.

The silicon carbide structure can have an interior surface of tortuous fluid passage comprising a floor and a ceiling separated by a height h and two opposing sidewalls joining the floor and the ceiling, with the sidewalls separated by a width w measured perpendicular to the height h and at a position corresponding to one-half of the height h wherein the height h of the tortuous fluid passage is in the range of from 0.1 to 20 mm. The height h of the tortuous fluid passage can be in the range of from 0.2 to 15 mm, or in the range of from 0.3 to 12 mm.

The process for forming a silicon carbide structure with an internal passage can comprise positioning a positive fluid passage mold of a passage having a tortuous shape within a volume of powder-coated silicon carbide powder; pressing the volume of silicon carbide powder with the mold inside to form a pressed body; heating the pressed body to remove the mold; and sintering the pressed body to form a monolithic silicon carbide structure having a tortuous fluid passage within. Pressing the volume of silicon carbide powder with the mold inside can comprise uniaxial pressing or isostatic pressing. Heating the pressed body to remove the mold can comprise pressing the pressed body while heating the pressed body. The process can further comprise debinding the pressed body before sintering the pressed body. The process can further comprise forming a positive passage mold of a passage having a tortuous shape by molding and/or 3-D printing the passage mold.

The process can further comprise forming a positive passage mold having an outer layer of lower melting material, the lower melting material having a melting point lower than a melting point of a remainder of the positive passage mold. The melting point of the lower melting material can be lower than the melting point of the remainder of the positive passage mold by at least 5° C.

While exemplary embodiments and examples have been set forth for the purpose of illustration, the foregoing description is not intended in any way to limit the scope of disclosure and appended claims. Accordingly, variations and modifications may be made to the above-described embodiments and examples without departing substantially from the spirit and various principles of the disclosure. All such modifications and variations are intended to be included herein within the scope of this disclosure and protected by the following claims.

What is claimed is:

1. A silicon carbide flow reactor fluidic module, the module comprising:
   a monolithic closed-porosity silicon carbide body; and
   a tortuous fluid passage extending through the silicon carbide body, the tortuous fluid passage having an interior surface that is free from any joints along the interior surface;
   the interior surface having a surface roughness of less than 10 μm Ra.

2. The fluidic module of claim 1 wherein the surface roughness is in the range of from 0.1 to 5 μm Ra.

3. The fluidic module of claim 1 wherein the surface roughness is in the range of from 0.1 to 1 μm Ra.

4. The fluidic module of claim 1 wherein the silicon carbide of the silicon carbide body has a density of at least 95% of a theoretical maximum density of silicon carbide.

5. The fluidic module of claim 4 wherein the silicon carbide of the silicon carbide body has a density of at least 97% of the theoretical maximum density of silicon carbide.

6. The fluidic module of claim 4 wherein the fluidic module has an open porosity of less than 1%.

7. The fluidic module of claim 1 wherein an internal pressure resistance of the fluidic module under pressurized water testing is at least 50 bar.

8. The fluidic module of claim 1 wherein an internal pressure resistance of the fluidic module under pressurized water testing is at least 150 bar.

9. The fluidic module of claim 1 wherein the interior surface of tortuous fluid passage comprises a floor and a ceiling separated by a height h and two opposing sidewalls joining the floor and the ceiling, the sidewalls separated by a width w measured perpendicular to the height h and at a position corresponding to one-half of the height h wherein the height h of the tortuous fluid passage is in the range of from 0.1 to 20 mm.

10. The fluidic module of claim 9 wherein the interior surface where the sidewalls meet the floor has a radius of curvature in the range of 0.1 to 3 mm.

11. A process for forming a silicon carbide fluidic module for a flow reactor, the process comprising:
   positioning a positive fluid passage mold of a passage having a tortuous shape within a volume of powder-coated silicon carbide powder;
   pressing the volume of silicon carbide powder with the mold inside to form a pressed body;
   heating the pressed body to remove the mold; and
   sintering the pressed body to form a monolithic silicon carbide fluidic module having a tortuous fluid passage extending therethrough, the tortuous fluid passage having an interior surface that is free from any joints along the interior surface,
   wherein the interior surface has a surface roughness of less than 10 μm Ra.

12. The process according to claim 11 wherein pressing the volume of silicon carbide powder with the mold inside to form a pressed body comprises uniaxial pressing.

13. The process according to claim 11 wherein pressing the volume of silicon carbide powder with the mold inside to form a pressed body comprises isostatic pressing in an isostatic press.

14. The process according to claim 13 wherein heating the pressed body to remove the mold comprises pressing the pressed body while heating the pressed body.

15. The process according to claim 14 wherein pressing the pressed body is performed in the isostatic press.

16. The process according to claim 11, further comprising, before sintering the pressed body, debinding the pressed body.

17. The process according to claim 11 further comprising forming a positive passage mold of a passage having a tortuous shape by molding the passage mold.

18. The process according to claim 11 further comprising forming a positive passage mold of a passage having a tortuous shape by 3-D printing the passage mold.

19. The process according to claim 11 further comprising forming a positive passage mold having an outer layer of lower melting material, the lower melting material having a melting point lower than a melting point of a remainder of the positive passage mold.

20. The process according to claim 19 wherein the melting point of the lower melting material is lower than the melting point of the remainder of the positive passage mold by at least 5° C.

* * * * *